United States Patent
Seo et al.

(10) Patent No.: US 9,346,225 B2
(45) Date of Patent: May 24, 2016

(54) METHOD OF PREPARING RESIN COMPOSITION FOR OPTICAL FILM BY USING CONTINUOUS BULK POLYMERIZATION AND METHODS OF PREPARING OPTICAL FILM AND POLARIZING PLATE USING THE RESIN COMPOSITION

(75) Inventors: Jae-Bum Seo, Daejeon (KR);
Chang-Hun Han, Daejeon (KR);
Dae-Woo Lee, Busan (KR); Jung-Tae Park, Yeosu-si (KR); Eun-Jung Choi, Jeollanam-do (KR); Byoung-Il Kang, Daejeon (KR); Joon-Sik Kim, Yeosu-si (KR); Nam-Jeong Lee, Daejeon (KR); Sang-Min Kwak, Daejeon (KR); Joong-Hoon Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 325 days.

(21) Appl. No.: 14/005,507

(22) PCT Filed: Apr. 5, 2012

(86) PCT No.: PCT/KR2012/002552
§ 371 (c)(1),
(2), (4) Date: Sep. 16, 2013

(87) PCT Pub. No.: WO2012/141453
PCT Pub. Date: Oct. 18, 2012

(65) Prior Publication Data
US 2014/0000801 A1 Jan. 2, 2014

(30) Foreign Application Priority Data
Apr. 13, 2011 (KR) .................. 10-2011-0034442
Sep. 19, 2011 (KR) .................. 10-2011-0093977

(51) Int. Cl.
| | |
|---|---|
| *C08F 6/00* | (2006.01) |
| *C08F 8/48* | (2006.01) |
| *C08F 220/06* | (2006.01) |
| *C08F 220/30* | (2006.01) |
| *C08F 220/14* | (2006.01) |
| *B29D 11/00* | (2006.01) |
| *G02B 1/04* | (2006.01) |
| *C08F 2/02* | (2006.01) |

(52) U.S. Cl.
CPC .............. *B29D 11/0073* (2013.01); *C08F 2/02* (2013.01); *C08F 220/14* (2013.01); *G02B 1/04* (2013.01)

(58) Field of Classification Search
None
See application file for complete search history.

(56) References Cited

U.S. PATENT DOCUMENTS

| | | | |
|---|---|---|---|
| 8,779,076 B2 * | 7/2014 | Yonemura | ............. C08F 220/14 526/271 |
| 2002/0082375 A1 | 6/2002 | Andrist et al. | |
| 2006/0100391 A1 | 5/2006 | Matsumoto et al. | |
| 2009/0275718 A1 | 11/2009 | Um et al. | |
| 2010/0036065 A1 | 2/2010 | Sohn et al. | |
| 2010/0105840 A1 | 4/2010 | Jin et al. | |
| 2011/0009585 A1 | 1/2011 | Yonemura et al. | |

FOREIGN PATENT DOCUMENTS

| | | | |
|---|---|---|---|
| CN | 1312824 | A | 9/2001 |
| CN | 1759143 | A | 4/2006 |
| CN | 101910223 | A | 12/2010 |
| EP | 0264508 | B1 | 9/1991 |
| JP | 06-025229 | B2 | 4/1994 |
| JP | 07-116262 | B2 | 12/1995 |
| JP | 2009-235249 | A | 10/2009 |
| JP | 2009-294262 | A | 12/2009 |
| JP | 20106966 | A | 1/2010 |
| JP | 2010-505022 | A | 2/2010 |
| JP | 2010-106249 | A | 5/2010 |
| JP | 2010-248318 | A | 11/2010 |
| KR | 1020100064971 | A | 6/2010 |
| KR | 1020100104518 | A | 9/2010 |
| TW | 201111400 | A1 | 4/2011 |

OTHER PUBLICATIONS

Machine translation of JP 2009-235249 A to Sato et al.*

* cited by examiner

*Primary Examiner* — Vu A Nguyen
(74) *Attorney, Agent, or Firm* — Dentons US LLP

(57) ABSTRACT

Provided is a method of preparing a resin composition for an optical film. The method includes forming a four-component copolymer by reacting an alkyl(meth)acrylate-based monomer, an acrylate-based monomer containing a benzene ring, and a (meth)acrylic acid monomer by using a continuous bulk polymerization method; and forming a resin composition for an optical film by removing unreacted monomer and solvent from a reaction product in a devolatilizer.

15 Claims, No Drawings

METHOD OF PREPARING RESIN COMPOSITION FOR OPTICAL FILM BY USING CONTINUOUS BULK POLYMERIZATION AND METHODS OF PREPARING OPTICAL FILM AND POLARIZING PLATE USING THE RESIN COMPOSITION

This application is a national stage application of International Application No. PCT/KR2012/002552, filed on Apr. 5, 2012, which claims priority to and the benefit of Korean Patent Application Nos. 10-2011-0034442, filed on Apr. 13, 2011, and 10-2011-0093977, filed on Sep. 19, 2011, in the Korean Intellectual Patent Office, all of which are incorporated herein by reference.

TECHNICAL FIELD

The present invention relates to methods of preparing a resin composition for an optical film, an optical film, and a polarizing plate, and more particularly, to a method of preparing a four-component copolymer resin composition for an optical film having excellent heat resistance and optical properties as well as having a low thermal expansion coefficient by using a continuous bulk polymerization method and methods of preparing an optical film and a polarizing plate using the four-component copolymer resin composition.

BACKGROUND ART

In line with recent advancements in optical technology, various display technologies replacing a conventional cathode ray tube (CRT), such as a plasma display panel (PDP), a liquid crystal display (LCD), and an organic electroluminescent display (OELD), have been developed and have become commercially available. Meanwhile, various polymer films such as a polarizing film, a polarizer protective film and a retardation film, as well as a light guide plate and a plastic substrate, have been used for such display devices and there is a trend for the use of such polymer materials in a display device of which required characteristics have become highly advanced.

Currently, the most widely used polymer film for a display is a triacetyl cellulose (TAC) film which is used for a polarizing plate protective film or the like. However, the TAC film may have limitations in that the polarizability thereof may be degraded, a polarizer and the film may be separated or optical properties thereof may deteriorate when the TAC film is used over a prolonged period of time in a high-temperature or high-humidity conditions. In order to resolve the foregoing limitations, a polystyrene-based polymer film or an acryl-based polymer film, such as methyl methacrylate or a polycarbonate-based polymer film, have been suggested as alternatives to the TAC film. The foregoing polymer films may have excellent heat resistance. However, birefringence may be generated during film alignment, thereby adversely affecting the optical properties thereof, because the polystyrene or polycarbonate film has an aromatic ring in the polymer, and with respect to the methyl methacrylate, a retardation value thereof is relatively small in comparison to polystyrene or polycarbonate, but the methyl methacrylate is insufficient to be used as a material for an optical device such as a liquid crystal device requiring a high level of precision.

In order to address such limitations, a method of copolymerizing or blending a monomer or a polymer having positive birefringence with a monomer or a polymer having negative birefringence has been suggested for a material for a polymer film having a low retardation value, as well as excellent heat resistance. A typical material used according to the foregoing method may be a copolymer of benzyl methacrylate and methyl methacrylate. However, with respect to the copolymer of benzyl methacrylate and methyl methacrylate, there is a limitation in that heat resistance is insufficient.

Meanwhile, as a method of improving heat resistance, a three-component copolymer composition including benzyl methacrylate, methyl methacrylate, and methacrylic acid has been suggested. However, with respect to the three-component copolymer including benzyl methacrylate, methyl methacrylate, and methacrylic acid, a retardation value and optical properties thereof are excellent, but there is a limitation in that a curling phenomenon may be generated, in which a polarizing plate is severely bent or distorted when the copolymer is laminated with a polarizer and a TAC film to be used, because a thermal expansion coefficient of the three-component copolymer may be higher than that of the TAC film used for a polarizing plate protective film. When the foregoing curling phenomenon occurs in a polarizing plate, display quality may deteriorate due to the occurrence of a light-leakage phenomenon in the polarizing plate and liquid crystals in a display panel may also be damaged. Therefore, urgent improvements to rectify the foregoing limitations are required.

DISCLOSURE

Technical Problem

An aspect of the present invention provides a method of preparing a resin composition for an optical film, in which a curling phenomenon does not occur after the lamination of a polarizing plate, due to excellent optical properties and heat resistance, as well as a low thermal expansion coefficient.

Technical Solution

According to an aspect of the present invention, there is provided a method of preparing a resin composition for an optical film including: forming a four-component copolymer by reacting an alkyl(meth)acrylate-based monomer, an acrylate-based monomer containing a benzene ring, and a (meth)acrylic acid monomer by using a continuous bulk polymerization method; and forming a resin composition for an optical film by removing an unreacted monomer and a solvent from a reaction product in a devolatilizer.

According to another aspect of the present invention, there is provided a method of preparing an optical film including preparing the resin composition prepared by the foregoing method in a film shape by using a solution cast or an extrusion method.

According to another aspect of the present invention, there is provided a method of preparing a polarizing plate, including bonding the optical film prepared by the foregoing method to at least one side of a polarizer.

Advantageous Effects

According to a preparation method of the present invention, a resin composition for an optical film, suitable for use in manufacturing a polarizing plate protective film, due to excellent optical properties and heat resistance, as well as having a low thermal expansion coefficient, may be obtained.

BEST MODE

Hereinafter, the present invention is described in more detail.

The inventors of the present invention conducted a great deal of research to develop a resin composition for an optical film having a low thermal expansion coefficient, as well as excellent optical properties and heat resistance, and, as a result, found that an optical resin composition, prepared by reacting alkyl(meth)acrylate, (meth)acrylate containing a benzene ring, and (meth)acrylic acid by a continuous bulk polymerization method, is appropriate for using as a polarizing plate protective film due to excellent optical properties and heat resistance, as well as a low thermal expansion coefficient, and completed the present invention.

A method of preparing a resin composition of the present invention includes: (I), forming a four-component copolymer by reacting an alkyl(meth)acrylate-based monomer, an acrylate-based monomer containing a benzene ring, and a (meth)acrylic acid monomer by using a continuous bulk polymerization method; and (II), forming a resin composition for an optical film by removing an unreacted monomer and a solvent from a reaction product in a devolatilizer.

Meanwhile, operation (I) is not limited thereto, but may include: (1), preparing a polymerization solution including a monomer mixture including an alkyl(meth)acrylate-based monomer, an acrylate-based monomer containing a benzene ring, a (meth)acrylic acid monomer, and a polymerization solvent; and (2), forming a four-component copolymer by reacting the polymerization solution by using a continuous bulk polymerization method.

In the present invention, the alkyl(meth)acrylate denotes both alkyl acrylate and alkyl methacrylate. In consideration of optical transparency, compatibility, processability, and productivity, a carbon number of an alkyl group of the alkyl (meth)acrylate-based monomer may be within a range of about 1 to 10, and, for example, the carbon number may be about 1 to 4. The alkyl group of the alkyl(meth)acrylate-based monomer may be a methyl or an ethyl group, and for example, the alkyl(meth)acrylate-based monomer may be methyl methacrylate. However, the alkyl(meth)acrylate-based monomer is not limited thereto. Meanwhile, the alkyl(meth)acrylate-based monomer may be mixed in an amount of about 65 to 93 parts by weight based on 100 parts by weight of the monomer mixture. The reason for this is that excellent retardation characteristics and optical properties may be obtained when the amount of the alkyl(meth)acrylate-based monomer is within the foregoing range.

In the present invention, the (meth)acrylate-based monomer containing a benzene ring provides an appropriate retardation value to the optical film of the present invention and compatibility between alkyl(meth)acrylate and (meth)acrylic acid. The (meth)acrylate-based monomer containing a benzene ring may be benzyl methacrylate or benzyl acrylate, and for example, may be benzyl methacrylate. Meanwhile, the (meth)acrylate-based monomer containing a benzene ring may be mixed in an amount of about 3 to 15 parts by weight based on 100 parts by weight of the monomer mixture. The reason for this is that desired retardation characteristics may be obtained when the amount of the (meth)acrylate-based monomer containing a benzene ring is within the foregoing range.

In the present invention, the (meth)acrylic acid monomer improves heat resistance and lowers a thermal expansion coefficient by introducing a polar group. Examples of the (meth)acrylic acid monomer may be an acrylic acid, a methacrylic acid, a methylacrylic acid, a methyl methacrylic acid, an ethylacrylic acid, an ethyl methacrylic acid, a butylacrylic acid, or a butyl methacrylic acid. For example, the (meth) acrylic acid monomer may be methacrylic acid. Meanwhile, the (meth)acrylic acid monomer may be mixed in an amount of about 5 to 20 parts by weight based on 100 parts by weight of the monomer mixture. The reason for this is that desired heat resistance characteristics may be obtained when the amount of the (meth)acrylic acid monomer is within the foregoing range.

Meanwhile, in the present invention, toluene, ethylbenzene, methyl ethyl ketone, methyl isobutyl ketone, dimethyl formamide (DMF), dimethyl acetamide (DMAC), or a mixture thereof may be used as the polymerization solvent. The monomer mixture and the polymerization solvent may be mixed in a weight ratio range of 90:10 to 50:50. When a content of the polymerization solvent is low, a rapid increase in viscosity may be generated during polymerization, and when the content of the polymerization solvent is high, productivity may decrease.

Meanwhile, additives such as a polymerization initiator, a chain transfer agent, and an antioxidant may be further mixed in a mixed solution (hereinafter, referred to as a "polymerization solution") of the monomer mixture and the polymerization solvent.

Examples of the polymerization initiator usable in the present invention may be one or more organic peroxides selected from the group consisting of t-butylperoxy-2-ethylhexanoate, 1,1-bis(t-butylperoxy)-3,3,5-trimethyl cyclohexane, 1,1-bis(t-butylperoxy)cyclohexane, 1,1-bis(t-butylperoxy)-2-methyl cyclohexane and 2,2-bis(4,4-di-t-butylperoxy cyclohexyl) propane. Meanwhile, a content of the polymerization initiator may be in a range of 0.01 to 0.1 parts by weight based on a total weight of the polymerization solution. When the content of the polymerization initiator is less than 0.01 parts by weight, the physical property balance of a total resin may not be obtained because polymerization is not facilitated in a reactor. When the polymerization initiator is used in an amount of more than 0.1 parts by weight, it may be disadvantageous and even dangerous to a process, due to an excessive increase in viscosity.

Meanwhile, the chain transfer agent is used for controlling viscosity of the resin, particle size, and particle distribution, and for example, a thiol-based compound such as t-dodecyl mercaptan or n-octyl mercaptan may be used as the chain transfer agent in the present invention. A content of the chain transfer agent may be in a range of about 0.01 to 1 part by weight based on 100 parts by weight of the polymerization solution. When the content of the chain transfer agent is less than 0.01 parts by weight, degradation of resin physical properties may occur, because an excessive increase in viscosity may cause disadvantages in a process. When the content of the chain transfer agent is more than 1 part by weight, the physical property balance of the total resin may not be obtained because polymerization is not performed.

Next, one or more hindered phenol-based antioxidants or phosphorous-based antioxidants, for example, may be used as the antioxidant. More particularly, Irgafos 168, Irganox 1076, and Irganox 245 may be used as the antioxidant. Meanwhile, a content of the antioxidant may be in a range of about 0.01 to part by weight based on 100 parts by weight of the polymerization solution. When the content of the antioxidant is less than 0.01 parts by weight, thermochromism may occur during post-processing. When the content of the antioxidant is more than 1 part by weight, heat resistance may decrease and product contamination may occur due to the migration of the antioxidant during post-processing.

When a polymerization solution is prepared by mixing a monomer mixture including an alkyl(meth)acrylate-based monomer, an acrylate-based monomer containing a benzene ring, and a (meth)acrylic acid monomer with a polymerization solvent, a four-component copolymer is formed by reacting the polymerization solution by using a continuous bulk polymerization method.

At this time, a reaction temperature of the continuous bulk polymerization may be in a range of about 120° C. to 160° C. When the reaction temperature is within the foregoing range, a four-component copolymer is formed. When the reaction temperature is low, polymerization is not facilitated, and when the reaction temperature is high, an increase in viscosity during a process may be caused by the occurrence of excessive polymerization. The reaction temperature may be adjusted by a heating device in the reactor.

When the four-component copolymer is formed from reactants by continuous bulk polymerization, removing an unreacted monomer and a solvent from the reaction product in a devolatilizer is performed. At this time, the removing of the unreacted monomer and the solvent may be performed when a polymerization conversion rate, according to the continuous bulk polymerization, reaches a range of 60% to 80%. When the polymerization conversion rate is less than 60%, a removal efficiency decreases due to a large remaining amount of the unreacted monomer, and when the polymerization conversion rate is more than 80%, the removal of the unreacted monomer and the solvent may be difficult due to conditions of high viscosity and high pressure. At this time, the polymerization conversion rate may be measured by collecting a sample in the reactor.

Meanwhile, the removing of the unreacted monomer and the solvent may be performed at a temperature range of 220° C. to 280° C. and in a vacuum range of about 10 Torr to 50 Torr. When the temperature is less than 220° C. during the removal of the unreacted monomer and the solvent, an improvement effect of curling properties may decrease, and glass transition temperature and color characteristics may deteriorate when the temperature is more than 280° C. Also, when the removal of the unreacted monomer and the solvent is performed outside of the foregoing temperature and vacuum ranges, the removal of the unreacted monomer and the solvent is not facilitated. As a result, physical properties may deteriorate due to the increases in the amounts of the residual monomer and the residual solvent in the product.

Also, the removing of the unreacted monomer and the solvent may be performed until a content of the monomer remaining in the reaction product reaches a range of about 500 ppm to 4000 ppm. The reason for this is that when the content of the residual monomer in the final resin composition deviates from the foregoing range, a haze value of a final product film may be poor and a failure rate may increase due to the generation of contamination or bubbles during the preparation of the film.

Also, if necessary, forming a pellet resin by extruding the formed copolymer may further be included after the removing of the unreacted monomer and the solvent.

Meanwhile, the present inventors found that when an alkyl (meth)acrylate-based monomer, a (meth)acrylate-based monomer containing a benzyl group, and a (meth)acrylic acid monomer are copolymerized by continuous bulk polymerization, as in the case of the present invention, a four-component copolymer is formed while a glutaric acid anhydride unit, which was not in the reactants, is newly formed in the product, different from the case in which a copolymer is formed through other polymerization methods such as solution polymerization or suspension polymerization. It is considered that the glutaric acid anhydride unit is formed by reacting an alkyl(meth)acrylate-based monomer and/or an acrylate-based monomer containing a benzene ring and a (meth) acrylic acid by means of high polymerization heat that is unique to continuous bulk polymerization. Meanwhile, with respect to the four-component copolymer including the glutaric acid anhydride unit, excellent retardation characteristics are maintained as in a three-component copolymer including an alkyl(meth)acrylate-based monomer, an acrylate-based monomer containing a benzene ring, and a (meth)acrylic acid monomer, and at the same time, a thermal expansion coefficient reduction effect which may not be obtained in the three-component copolymer, is surprisingly generated. The reason for this is that polymer chain rotation is prevented by a bulky functional group of the glutaric acid anhydride.

Therefore, the resin composition for an optical film prepared according to the method of the present invention is a four-component copolymer resin composition including: an alkyl(meth)acrylate unit; a (meth)acrylate unit containing a benzene ring; a (meth)acrylic acid unit; and a glutaric acid anhydride unit.

In the 4-component copolymer resin composition prepared by the method of the present invention, a content of the alkyl(meth)acrylate unit is in a range of about 55 to 93 parts by weight based on 100 parts by weight of the resin composition.

Meanwhile, in the resin composition prepared by the method of the present invention, a content of the (meth) acrylate unit containing a benzyl group is in a range of about 2 to 20 parts by weight based on 100 parts by weight of the resin composition.

Also, in the resin composition prepared by the method of the present invention, a content of the (meth)acrylic acid unit is in a range of about 1 to 10 parts by weight, may be in a range of about 1 to 5 parts by weight, and for example, may be in a range of about 1 to 2 parts by weight based on 100 parts by weight of the resin composition. In particular, the present inventors found that the generation of bubbles may be significantly reduced during a film preparation process, when the content of the (meth)acrylic acid unit in the final resin composition is 2 parts by weight or less.

Finally, in the resin composition prepared by the method of the present invention, a content of the glutaric acid anhydride unit is in a range of about 3 to 15 parts by weight. When the content of the glutaric acid anhydride unit is less than 3 parts by weight, a thermal expansion coefficient reduction effect is insignificant, and film toughness may be decreased when the content of the glutaric acid anhydride unit is more than 15 parts by weight.

Meanwhile, a glass transition temperature of the resin composition for an optical film according to the present invention including the foregoing components may be in a range of about 120° C. to 500° C., may be in a range of 125° C. to 500° C., and for example, may be in a range of 125° C. to 200° C. Also, in terms of processability, heat resistance, and productivity, a weight-average molecular weight may be in a range of 50,000 to 500,000, and for example, may be in a range of about 50,000 to 200,000.

Further, the resin composition for an optical film has excellent optical properties, in which a haze value is in a range of about 0.1% to 3%, a light transmittance is 90% or more, and a yellowing index value is in a range of about 0.3 to 2.0.

Meanwhile, another aspect of the present invention relates to a method of preparing an optical film including forming the resin composition prepared by the foregoing method into a film shape by using a solution casting or an extrusion method.

In some cases, an additive such as a conditioner may be additionally added within a range that will not deteriorate the physical properties of the film during a preparing process of the film and a uniaxial or biaxial stretching process may be additionally performed after the preparation of the film.

In the stretching process, machine direction (MD) stretching or transverse direction (TD) stretching may be respectively performed, or both may be performed. In the case that both machine direction stretching and transverse direction stretching are performed, any one of stretchings may first be performed and then the stretching in the other direction may be performed or both stretching processes may be performed at the same time. Further, the stretching processes may be performed in a single operation, and may also be performed through multiple operations. Stretching by means of the speed difference between rolls may be performed with respect to the machine direction stretching and a tenter may be used with respect to the transverse direction stretching. A rail start angle of the tenter is generally set to within 10 degrees to prevent a bowing phenomenon generated during transverse direction stretching and to control an angle of an optical axis regularly. The effect of preventing the bowing phenomenon may be obtained when the transverse direction stretching is performed through multiple operations.

Meanwhile, when the glass transition temperature of the resin composition is referred to as 'Tg', the stretching may be performed at a temperature ranging from (Tg−20]) (Tg+30]). The glass transition temperature refers to a temperature range starting from a temperature at which a storage modulus of the resin composition starts to be lowered so a loss modulus starts to be increased to be greater than the storage modulus to a temperature at which orientation of polymer chains is lessened to be lost. The glass transition temperature of the resin composition may be measured by a differential scanning calorimeter (DSC). The temperature during the stretching process may be, for example, the glass transition temperature of the resin composition.

A stretching operation may be performed at a stretching speed range of 1 m/min to 100 m/min with respect to a small stretching machine (universal testing machine, Zwick Z010) and may be performed at a stretching speed range of 0.1 m/min to 2 m/min with respect to a pilot stretching machine. A stretch ratio may be in a range of about 5% to 300%.

Retardation characteristics of the film may be controlled through the foregoing stretching process.

Meanwhile, an optical film of the present invention prepared by the foregoing method may have an in-plane retardation value ($R_{in}$) ranging from 0 nm to 10 nm and a thickness retardation value ($R_{th}$) ranging from about −5 nm to nm at a wavelength of 580 nm. Herein, the in-plane retardation value denotes a value defined by the following Mathematical Equation 1 and the thickness retardation value denotes a value defined by the following Mathematical Equation 2.

$$R_{in} = (n_x - n_y) \times d \qquad \text{[Mathematical Equation 1]}$$

$$R_{th} = (n_z - n_y) \times d \qquad \text{[Mathematical Equation 2]}$$

where $n_x$ is an in-plane refractive index of the film in a direction having the largest refractive index, $n_y$ is an in-plane refractive index of the film in a direction perpendicular to the $n_x$ direction, $n_z$ is a thickness refractive index, and d is a thickness of the film.

Also, a thermal expansion coefficient of the optical film of the present invention may be in a range of about 50 ppm/K to 70 ppm/K. The reason for this is that the occurrence of curling after lamination of the polarizing plate may be prevented when the thermal expansion coefficient of the optical film is within the foregoing range.

Further, the optical film of the present invention has a thickness range of 20 μm to 200 μm, and may have a thickness range of 40 μm to 120 μm. Transparency is in a range of 0.1% to 3%, and the degree of light transmission may be 90% or more. The reason for this is that the optical film of the present invention is suitable to be used as a polarizing plate protective film when the thickness, transparency, and transmittance of the film are within the foregoing ranges.

Another aspect of the present invention relates to a method of preparing a polarizing plate, including bonding the optical film of the present invention prepared by the foregoing method to at least one side of a polarizer.

The optical film according to the present invention may be included on both sides of the polarizer or may only be included on one side thereof. When the optical film according to the present invention is included on one side of the polarizer, a polarizer protective film well known in the art such as a triacetyl cellulose (TAC) film, a polyethylene terephthalate (PET) film, a cyclo-olefin (COP) film, a polycarbonate (PC) film, or a norbornene-based film may be included on the other side thereof. In consideration of economic factors, the TAC film, for example, may be included among the foregoing polarizer protective films. Since the optical film of the present invention has a thermal expansion coefficient similar to that of the TAC film, a curling phenomenon generated due to the difference in the thermal expansion coefficient may be minimized when the TAC film is adhered to one side of the polarizer and the optical film of the present invention is adhered to the other side.

Meanwhile, the adhesion between the polarizer and the optical film and/or the protective film of the present invention may be performed by a method in which an adhesive is coated on surfaces of the film or the polarizer by using a roll coater, a gravure coater, a bar coater, a knife coater, or a capillary coater, and then the protective film and the polarizer are heated and laminated by a laminating roll or laminated by pressing at room temperature. Meanwhile, adhesives used in the art such as a polyvinyl alcohol-based adhesive, a polyurethane-based adhesive, or an acryl-based adhesive may be used without limit as the foregoing adhesive.

MODE FOR INVENTION

Hereinafter, the present invention will be described in detail, according to specific examples. The following examples are merely provided to allow for a more clearly detailed understanding of the present invention, rather than to limit the scope of the present invention.

A method of evaluating physical properties in the present invention is as below.

1. Weight-Average Molecular Weight: the prepared resin was dissolved in tetrahydrofuran and measured by using gel permeation chromatography (GPC).

2. Glass Transition Temperature (Tg): measured by using a differential scanning calorimeter (DSC) of TA instruments.

3. Haze and light Transmittance: measured according to an ASTM 1003 method.

4. Toughness: a state of disconnection was measured by bending a 60 μm thick film by hand, and a case of no disconnection during 10 bends was denoted by ⊚, a case of 1 to 3 disconnections was denoted by ◯, and a case of 5 or more disconnections was denoted by X.

5. Coefficient of Thermal Expansion (CTE): measured by using a Pyris 6 DSC of Perkin Elmer Inc.
6. Curling Properties: products were stored in a constant temperature and humidity chamber (25° C., 50% RH) for 24 hours after being laminated to be a polarizing plate, and then polarizing plate curvatures were measured.
7. Retardation: measured by using an Elli-SE of Ellipso Technology.
8. Resin Composition: measured by using a C13-NMR
9. Yellowing Index (YI): measured by using a color meter of Hunter Associates Laboratory, Inc.

EXAMPLES 1 to 7

Methyl methacrylate, methacrylic acid, and benzyl methacrylate are mixed in a toluene polymerization solvent according to the contents described in the following Table 1, and a polymerization solution was prepared by introducing 0.03 parts by weight of a dicumyl peroxide initiator, 0.5 parts by weight of a t-dodecyl mercaptan chain transfer agent, and 0.2 parts by weight of an Iraganox 245 antioxidant into the mixed solution. Thereafter, the polymerization solution was introduced into a 16 l reactor at a rate of 12 l/hr and was polymerized by continuous bulk polymerization at a reaction temperature range of 120° C. to 160° C. When the polymerization conversion rate was in a range of 60% to 80%, the reaction product was continuously introduced into a devolatilizer in order to remove unreacted monomer and solvent. The temperature and degree of vacuum of the devolatilizer were the same as described in Table 1. Thereafter, a resin in a pellet form was prepared by extruding a reaction product in which the unreacted monomer and the solvent are removed.
The composition, weight-average molecular weight, glass transition temperature, haze, light transmittance, and yellowing index of the resin prepared through the foregoing method were measured. The measurement results are shown in Table 1.

Next, a 180 μm thick film was prepared from the resin by using a T-die extruder and a 60 μm thick film was prepared through biaxially stretching the 180 μm thick film two times in a machine direction (MD) and three times in a transverse direction (TD). The retardation value, toughness, and thermal expansion coefficient of the prepared optical film were measured. The measurement results are shown in Table 1.

The optical film and TAC film (Fuji Film) were adhered respectively to each side of a PVA film to prepare a polarizing plate, and then curling properties thereof were measured. The measurement results are shown in Table 1.

TABLE 1

| Category | | Example 1 | Example 2 | Example 3 | Example 4 | Example 5 | Example 6 | Example 7 |
|---|---|---|---|---|---|---|---|---|
| Polymerization solution | BzMA | 3 | 8 | 15 | 8 | 8 | 8 | 8 |
| | MMA | 85 | 80 | 73 | 87 | 74 | 80 | 80 |
| | MAA | 12 | 12 | 12 | 5 | 18 | 12 | 12 |
| Temperature of devolatilizer (° C.) | | 250 | 250 | 250 | 250 | 250 | 270 | 220 |
| Degree of vacuum of devolatilizer (Torr) | | 20 | 20 | 20 | 20 | 20 | 20 | 20 |
| Resin composition | BzMA | 3.2 | 8.1 | 15.2 | 8.2 | 8.1 | 8.2 | 8.1 |
| | MMA | 85.4 | 80.1 | 72.9 | 87.3 | 74.1 | 80.3 | 79.8 |
| | MAA | 2.5 | 2.3 | 2.4 | 1.4 | 3.6 | 1.7 | 2.9 |
| | G/A | 8.9 | 9.5 | 9.5 | 3.1 | 14.2 | 9.8 | 9.2 |
| Physical properties of resin | Weight-average molecular weight | 101,000 | 112,000 | 94,000 | 123,000 | 83,000 | 115,000 | 114,000 |
| | Tg (° C.) | 128 | 125 | 123 | 121 | 136 | 124 | 125 |
| | Haze | 0.2 | 0.3 | 0.2 | 0.2 | 0.4 | 0.2 | 0.3 |
| | Residual monomer (ppm) | 1,500 | 1,600 | 1,700 | 1,500 | 1,300 | 800 | 3,500 |
| | YI | 0.6 | 0.7 | 0.8 | 0.5 | 0.9 | 1.1 | 0.4 |
| | Light transmittance (%) | 93.2 | 92.4 | 92.1 | 93.3 | 92.1 | 92.6 | 92.5 |
| Physical properties of film | $R_{in}/R_{th}$ | 0.3/0.1 | 0.6/−0.8 | 1.1/−3.5 | 1.4/−1.3 | 3.1/−2.5 | 1.4/−0.4 | 0.9/0.3 |
| | Toughness | ◎ | ◎ | ○ | ◎ | ○ | ◎ | ◎ |
| | CTE (ppm/° C.) | 59 | 58 | 58 | 63 | 53 | 56 | 59 |
| Physical properties of polarizing plate | Curling properties | 134 | 133 | 136 | 148 | 125 | 131 | 139 |

BzMA: Benzyl methacrylate
MMA: Methyl methacrylate
MAA: Methacrylic acid
G/A: Glutaric acid anhydride
YI: Yellowing index
CTE: Coefficient of thermal expansion COMPARATIVE EXAMPLES 1 to 7

A resin composition, optical film, and polarizing plate were respectively prepared in the same manner as those of Examples 1 to 7, except that contents of methyl methacrylate, methacrylic acid, and benzyl methacrylate monomers and the temperature and degree of vacuum of devolatilizer were applied as described in the following Table 2. The composition, weight-average molecular weight, glass transition temperature, haze, light transmittance, and yellowing index of the prepared resin were measured by the same methods as those of Examples 1 to 7 and are shown in Table 2. Also, the retardation value, toughness, and thermal expansion coefficient of the prepared optical film were measured by the same methods as those of Examples 1 to 7 and are shown in Table 2. The curling properties of the polarizing plate were also measured by the same methods as those of Examples 1 to 7, and are shown in Table 2.

TABLE 2

| Category | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Polymerization solution | BzMA | 0 | 20 | 8 | 8 | 8 | 8 | 8 |
| | MMA | 88 | 68 | 92 | 67 | 80 | 80 | 80 |
| | MAA | 12 | 12 | 0 | 25 | 12 | 12 | 12 |
| Temperature of devolatilizer (° C.) | | 250 | 250 | 250 | 250 | 300 | 200 | 250 |
| Degree of vacuum of devolatilizer (Torr) | | 20 | 20 | 20 | 20 | 20 | 20 | 100 |
| Resin composition | BzMA | 0 | 21.1 | 8.1 | 7.8 | 7.7 | 8.1 | 8.2 |
| | MMA | 87.5 | 67.3 | 91.9 | 67.3 | 78.2 | 80.2 | 80.4 |
| | MAA | 2.3 | 2.1 | 0 | 5.6 | 1.1 | 9.8 | 8.5 |
| | G/A | 10.2 | 9.5 | 0 | 19.2 | 13.0 | 1.9 | 2.9 |
| Physical properties of resin | Weight-average molecular weight | 109,000 | 101,000 | 124,000 | 67,000 | 89,000 | 113,000 | 109,000 |
| | Tg (° C.) | 130 | 118 | 104 | 139 | 119 | 110 | 109 |
| | Haze | 0.2 | 0.3 | 0.2 | 3.3 | 1.4 | 1.8 | 2.3 |
| | Residual monomer (ppm) | 1,400 | 1,500 | 1,600 | 1,400 | 6,100 | 8,400 | 103,000 |
| | YI | 0 | 0.7 | 0.8 | 1.0 | 4.1 | 0.4 | 0.5 |
| | Light transmittance (%) | 93.2 | 92.3 | 92.2 | 89.1 | 89.6 | 89.9 | 89.9 |
| Physical properties of film | $R_{in}/R_{th}$ | 11.6/13.5 | 8.7/−15.3 | 1.0/1.6 | 5.9/−7.3 | 3.4/−1.5 | 1.2/−1.4 | 0.1/1.3 |
| | Toughness | ○ | ◎ | ○ | X | X | ◎ | ◎ |
| | CTE (ppm/° C.) | 52 | 57 | 85 | 49 | 51 | 78 | 74 |
| Physical properties of polarizing plate | Curling properties | 123 | 134 | 305 | 119 | 122 | 280 | 260 |

BzMA: Benzyl methacrylate
MMA: Methyl methacrylate
MAA: Methacrylic acid
G/A: Glutaric acid anhydride
YI: Yellowing index
CTE: Coefficient of thermal expansion While the present invention has been shown and described in connection with the exemplary embodiments, it will be apparent to those skilled in the art that modifications and variations can be made without departing from the spirit and scope of the invention as defined by the appended claims.

The invention claimed is:

1. A method of preparing a resin composition for an optical film, the method comprising:
   preparing a polymerization solution including a monomer mixture including alkyl(meth)acrylate-based monomer, acrylate-based monomer containing a benzene ring, (meth)acrylic acid monomer, and a polymerization solvent;
   forming a four-component copolymer by reacting the polymerization solution by using a continuous modified bulk polymerization method; and
   forming a resin composition for an optical film by removing unreacted monomer and solvent from a reaction product in a devolatilizer,
   wherein the removing of the unreacted monomer and the solvent is performed when a polymerization conversion rate reaches a range of about 60% to about 80%,
   wherein the removing of the unreacted monomer and the solvent is performed at a temperature range of about 220° C. to about 280° C. in a vacuum range of 10 Torr to 50 Torr,
   wherein the removing of the unreacted monomer and the solvent is performed until a content of a residual monomer in a product reaches a range of about 500 ppm to about 4000 ppm, and
   wherein the four-component copolymer comprises an alkyl(meth)acrylate unit, a (meth)acrylate unit containing a benzene ring, a (meth)acrylic acid unit, and a glutaric acid anhydride unit.

2. The method of claim 1, wherein the monomer mixture comprises: about 65 to 92 parts by weight of the alkyl(meth)acrylate-based monomer; about 3 to 15 parts by weight of the acrylate-based monomer containing a benzene ring; and about 5 to 20 parts by weight of the (meth)acrylic acid monomer, based on 100 parts by weight of the monomer mixture.

3. The method of claim 1, wherein the monomer mixture comprises: about 65 to 92 parts by weight of a methyl methacrylate monomer; about 3 to 15 parts by weight of a benzyl methacrylate monomer; and about 5 to 20 parts by weight of a methacrylic acid monomer, based on 100 parts by weight of the monomer mixture.

4. The method of claim 1, wherein a weight ratio between the monomer mixture and the polymerization solvent is in a range of about 90:10 to about 50:50 in the polymerization solution.

5. The method of claim 1, wherein the polymerization solution further comprises one or more selected from the group consisting of a polymerization initiator, a chain transfer agent, and an antioxidant.

6. The method of claim 1, wherein a reaction temperature of the continuous bulk polymerization is in a range of about 120° C. to about 160° C.

7. The method of claim 1, further comprising forming a pellet resin by extruding the formed copolymer, after the removing of the unreacted monomer and the solvent.

8. The method of claim 1, wherein the alkyl(meth)acrylate-based monomer is methyl methacrylate.

9. The method of claim 1, wherein the acrylate-based monomer containing a benzene ring is benzyl methacrylate.

10. The method of claim 1, wherein the (meth)acrylic acid monomer is a methacrylic acid.

11. The method of claim 1, wherein the polymerization solvent is one or more selected from the group consisting of toluene, ethylbenzene, methyl ethyl ketone, methyl isobutyl ketone, dimethyl formamide (DMF), and dimethyl acetamide (DMAC).

12. The method of claim 1, wherein the resin composition for an optical film is a four-component copolymer resin composition comprising: about 55 to 93 parts by weight of the alkyl(meth)acrylate unit; about 2 to 20 parts by weight of the (meth)acrylate unit containing a benzene ring; about 1 to 10 parts by weight of the (meth)acrylic acid unit; and about 3 to 15 parts by weight of the glutaric acid anhydride unit.

13. The method of claim 12, wherein the resin composition for an optical film has a weight-average molecular weight range of about 50000 to about 200000.

14. The method of claim 12, wherein the resin composition for an optical film has a haze value range of about 0.1% to about 3%.

15. The method of claim 12, wherein the resin composition for an optical film has a yellowing index value range of about 0.3 to about 2.0.

\* \* \* \* \*